Nov. 13, 1962

B. F. THOMAS ET AL  
METHOD AND APPARATUS FOR FABRICATING  
CELLULAR CORE MATERIAL 3,064,116

Filed June 16, 1959

INVENTORS.  
BOYD F. THOMAS  
JAMES C. THOMAS, III  
BY

ATTORNEY.

Nov. 13, 1962

B. F. THOMAS ET AL  
METHOD AND APPARATUS FOR FABRICATING  
CELLULAR CORE MATERIAL 3,064,116

Filed June 16, 1959

INVENTORS.  
BOYD F. THOMAS  
JAMES C. THOMAS, III  
BY  
ATTORNEY.

Nov. 13, 1962   B. F. THOMAS ET AL   3,064,116
METHOD AND APPARATUS FOR FABRICATING
CELLULAR CORE MATERIAL
Filed June 16, 1959   10 Sheets-Sheet 5

INVENTORS.
BOYD F. THOMAS
JAMES C. THOMAS, III
BY
ATTORNEY.

INVENTORS.
BOYD F. THOMAS
JAMES C. THOMAS, III
BY
ATTORNEY.

Nov. 13, 1962  B. F. THOMAS ET AL  3,064,116
METHOD AND APPARATUS FOR FABRICATING
CELLULAR CORE MATERIAL
Filed June 16, 1959  10 Sheets-Sheet 7

FIG. 8
FIG. 9

INVENTORS.
BOYD F. THOMAS
JAMES C. THOMAS, III
BY
ATTORNEY.

INVENTORS.
BOYD F. THOMAS
JAMES C. THOMAS, III

BY

ATTORNEY.

Nov. 13, 1962     B. F. THOMAS ET AL     3,064,116
METHOD AND APPARATUS FOR FABRICATING
CELLULAR CORE MATERIAL
Filed June 16, 1959     10 Sheets-Sheet 10

INVENTORS.
BOYD F. THOMAS
JAMES C. THOMAS, III
BY 
ATTORNEY.

United States Patent Office 3,064,116
Patented Nov. 13, 1962

3,064,116
METHOD AND APPARATUS FOR FABRICATING CELLULAR CORE MATERIAL
Boyd F. Thomas and James C. Thomas III, Pasadena, Calif., assignors to Young Spring & Wire Corporation, Detroit, Mich., a corporation of Michigan
Filed June 16, 1959, Ser. No. 820,638
22 Claims. (Cl. 219—82)

This invention relates to the fabrication of cellular core structures and more particularly to an improved method and apparatus for automatically fabricating metal foil stripping wherein fabricated core material and a length of corrugated stripping are advanced into welding position and held stationary there while welding electrodes are passed astride abutting crests to weld the same together following which the electrodes are retracted while further increments of material advance into welding position and are arrested in precise welding position in readiness for the next excursion of the welding electrodes.

The apparatus and method disclosed in this application are closely related to those disclosed in our co-pending application for United States Letters Patent Serial No. 820,765, filed June 16, 1959, for Apparatus and Method for Producing Honeycomb Core Material. The apparatus and method practiced by the herein disclosed embodiment of the invention differs in certain important respects from the aforementioned co-pending application. These differences pertain not only to the general arrangement and construction of the principal subassemblies and components, but particularly to the mode of advancing the material past the welding station and the mode of orienting and clamping the parts to be welded accurately and precisely in position preliminary to the welding operation. For example, it has been proposed heretofore to advance cellular core material formed from ribbon foil past a welding station either by indexing mechanism employed alone or in combination with a motor driven conveyor belt supporting fabricated portions of the core. Apparatus for practicing both these methods are disclosed, for example, in United States Letters Patent 2,843,722, issued to Milton G. Wegeforth, on July 15, 1958. Although both of these material feeding methods can be employed with considerable success when fabricating comparatively short and narrow sections of core material, neither is satisfactory in fabricating large sections of core from metal foil of a few mils or less in thickness. This is because the fragile and very thin foil material will not withstand the loads and stresses imposed on it by the indexing pins and by the conveyor belt.

For example, as the size and weight of the core increases the load imposed on the cell walls by the indexing pins distorts the individual cells as the pins act on each in succession to advance the core. The use of the conveyor belt in combination with the pins to distribute the load to cells not in contact with the pins introduces new problems. If the conveyor belt operates continuously as proposed by the aforementioned Wegeforth patent, then the intermittent interruption in the advance of that portion of the core adjacent the welding station causes the conveyor belt to flex edges of cell ends contacting the belt in first one direction and then the other as the core is alternately indexed forward and then held stationary while the conveyor continues to move. It will be recognized that these undesirable characteristics of the core feeding mechanisms heretofore proposed damage the cell ends and necessitate subjecting the completed core to time consuming and costly machining to remove the damaged end portions of the cells.

In apparent recognition of the disadvantages of using a conveyor to advance the material, the aforementioned Wegeforth patent suggests that fabrication of coring in wider widths may require the use of an extension arm carried by the indexing mechanism having toothed clutch plates engageable with the underside of the core to aid advance of the entire width of the core simultaneously. This mode of relieving the load imposed on the core by the indexing pins can likewise damage the cell ends as the same are engaged by the teeth on the clutch plates.

Another shortcoming of methods and apparatus heretofore provided for fabricating metal foil into honeycomb core material relates to means for aligning lateral edges of the foil ribbon precisely with the surfaces of fabricated core and with the abutting crests to be welded together in firm and accurate engagement with one another. Various expedients have been proposed to meet these dual objectives. The problem is complicated by the fact that the fragile core is ever expanding as well as by the fact that the incoming length of corrugated ribbon to be welded in place is easily deformed or crushed and is difficult to position with precision without risk of damaging it.

Another shortcoming of prior welders has been the lack of high precision reciprocal welding electrodes which can be brought quickly and accurately into welding position and operated under the requisite welding pressure without disturbing the aligned position of the components and without risk of damage to these components. The electrodes must be small enough to enter the very small cells of the core, yet large enough and rugged enough to handle the required welding currents and pressures.

The foregoing and other shortcomings of the prior art techniques and welding apparatus are entirely avoided by the present invention making use of cellular core supporting and advancing means so constructed and arranged as to avoid injury even to the thinnest and softest of core forming ribbon. Owing to the provision of novel power driven conveyor means constantly urging the advance of the core past the welding station by polished hard-surfaced feeding surfaces capable of slippage past the slower core without the slightest damage to this delicate material, assurance is provided that the core will be advanced as needed by the welder but without hazard to the edge of the delicate core cells or need for expensive coordinated intermittent drive means for the conveyor.

Furthermore, the very considerable contraction and expansion capability of the elastic core lengthwise thereof can be utilized advantageously by the referred-to improved core conveyor. Thus, the constant urging of the core toward the welding station imposed by the conveyor tends to compress the core on the entrance side of the welding station and the elastic tensioning of the core on the discharge side of the welder. The relatively small quantities of elastic compression and tension energy so stored in the core supplements the conveyor proper in facilitating the rapid advance of the core to the next welding position following the completion of individual welding operations. By reason of these forces available for advancing the core through the welding station, by the present invention the indexing feed mechanism relied upon in our aforementioned co-pending application for core indexing purposes serves quite a different function here, namely, that of arresting the forward movement of the core at its desired welding position. High precision location of the core at the welding station is thereby made possible since the arresting pins are desirably formed to enter the apex portion of non-circular core cells, a position which is much more precise than is possible when utilizing a pin substantially filling the entire cell as is necessary when using these pins for the dual purpose of indexing and of positioning at the welding station. Furthermore, the smaller holding pins made possible by this arrangement require a smaller increment of time for entrance into the cell and are therefore easier to inject and withdraw from the cell without risk of damage to themselves or to the core.

Another important feature of this invention is an improved material clamping arrangement which avoids definite shortcomings of prior arrangements by utilizing simplified clamping members arranged in several mutually cooperating pairs. One pair of clamping members functions similarly to those in our co-pending application, namely, to align the edges of the corrugated ribbon precisely co-planar with the surfaces of fabricated core. Performing an equally important function are a pair of holding pins parallel to and movable with one of the welding electrodes and positioned to enter cells to either side of the pair of crests being welded together. Cooperating with these holding pins shaped to completely fill the cells occupied thereby are a pair of resiliently supported clamping plates which embrace the crests of the ribbon to either side of the ribbon crest actually undergoing welding.

Cooperating with the sets of clamping plates just referred to in the positioning of the core at the welding station are a plurality of pressurized fluid jets delivered against the core in a manner to maintain the core positioned in registration with the holding pins and pressed lightly against the advancing ribbon to be welded to the core. Thus, it will be understood that the pressurized fluid and the constantly moving conveyor mutually assist one another in advancing the core a length of corrugated ribbon without need for contact of either the core or the ribbon with positively acting mechanical feeding means in the vicinity of the welding station proper.

Another feature of the invention is a combined core-feed arresting mechanism and a welding electrode assembly operated in predetermined coordinated phase relation from a common power-driven shaft. The welding assembly includes a pair of cam surfaces so arranged with respect to a pair of independently reciprocal welding electrodes as to advance the electrodes in predetermined but variable phase relation such that the electrode last to advance is retracted first. The several pairs of material clamping members employed for positioning the material properly for welding are activated by the welding assembly and in predetermined timed patterns.

Accordingly, it is a primary object of the present invention to provide an improved method and apparatus for fabricating cellular core material from metal foil ribbon utilizing resistance welding for holding the components joined together.

Another object of the invention is the provision of automatic welding apparatus having improved means for feeding cellular core material past a welding station without risk of injury to the core material.

Another object of the invention is the provision of an automatic welder for fabricating cellular core material in which passage of the core past a welding station is facilitated by a supporting conveyor arranged to be driven faster than the desired rate of advance of the core and having smooth hard-finished surfaces in supporting contact with the core which surfaces are capable of relative movement with respect to the core cell ends without causing deformation or injury thereto.

Another object of the invention is the provision of an automatic welder for fabricating cellular core material having means constantly urging the advance of material past the welder in association with intermittently operable means to arrest the advance of the core accurately in a preselected welding position and for holding it briefly arrested while pairs of automatically actuated clamping members align and clamp the parts to be welded precisely in welding position.

Another object of the invention is the provision of means for utilizing pressurized fluid to facilitate the positioning of the components to be welded as an incident to the automatic and sequential advance of material undergoing fabrication.

Another object of the invention is the provision of an automatic welder for fabricating cellular core material from metal foil ribbon and making use of pressurized fluid to maintain the core material under slight transverse pressure as the material passes through a welding station.

Another object of the invention is the provision of a welding electrode assembly for fabricating cellular core material having pairs of material clamping and positioning members operatively associated with the welding electrodes and cooperable with the movement of the same into welding position to preposition and clamp the parts accurately in welding position before applying welding current and pressure to the parts.

Another object of the invention is the provision of an improved welding assembly and coordinated material arresting mechanism operable in timed relation from a common driving shaft.

Another object of the invention is the provision of an improved method and apparatus for circulating a closed loop of transversely corrugated metal foil ribbon past a welding station operable to weld the oppositely facing abutting crests of adjacent convolutions of said ribbon together.

These and other more specific objects will appear upon reading the following specification and claims and upon considering in connection therewith the attached drawings to which they relate.

Referring now to the drawings in which a preferred embodiment of the invention is illustrated.

Referring more particularly to FIGURES 1 to 7, there is shown a preferred embodiment of the invention designated generally 10 comprising a rectangular base 11 formed of channel members welded together at their corners. A heavy gauge steel cabinet 12 housing electronically controlled welding equipment of well known commercial type is rigidly secured to the forward end of the base 11 in any suitable manner and includes a door 13 provided with a handle 14. Equipment cabinet 12 is so sturdy as to provide a supporting pedestal for the welding and core feeding assemblies. One of the principal supporting brackets for such assemblies comprises a thick metal panel 15 secured vertically to the upper right hand corner of cabinet 12 as viewed in FIGURE 13 by cap screws 30. Bracket panel 15, taken together with other brackets secured to the top of cabinet 12, provides a rigid support for a flat surfaced table top 16 (FIGURES 1, 2, 4 and 6) across which the cellular core is advanced to the welding electrodes.

Secured to base 11 rearward of cabinet 12 is a large heavy-duty panel 17, the opposite ends of which project laterally for six to eight feet to either side of main base 11. The upper center portion of panel 17 is cut away at 18 to fit about the welding station and table top 16. A primary purpose of panel 17 is to support the core feeding or conveyor mechanism. The core material under fabrication is preferably arranged in a closed loop 19. The conveyor support for core 19 may take various forms but as here shown includes a plurality of spindles 20 rotatably supported in journals 21 (FIGURE 5) mounted about the peripheral portions of the rear face of panel 17. Spindles 20 have very hard polished surfaces against which the core material rests by gravity action. Accordingly, individual spindles have a rather inefficient and a non-positive contact with the core. Each spindle 20 has fixed thereto a sprocket 21′ over which a roller chain belt 22 passes. Belt 22 also passes over a number of idler sprockets 23 having journal supports in panel 17. Belt 22 is driven from the main power source in a manner to be described presently.

Each spindle 20 carries a pair of discs 24, 25 adjustable axially of the spindle and securable in adjusted position thereto in any suitable manner as by a set screw not shown. Normally, discs 25 are set to lie in a plane flush with side wall 188 of fence 186 along the top of table top 16 and remain in the same adjusted position at all times. However, outer discs 24 desirably are shifted outwardly along spindles 20 periodically and as additional convolutions of corrugated ribbon are welded to core 19 and aid in maintaining the core positioned in close alignment with the welding station.

Figure 1:
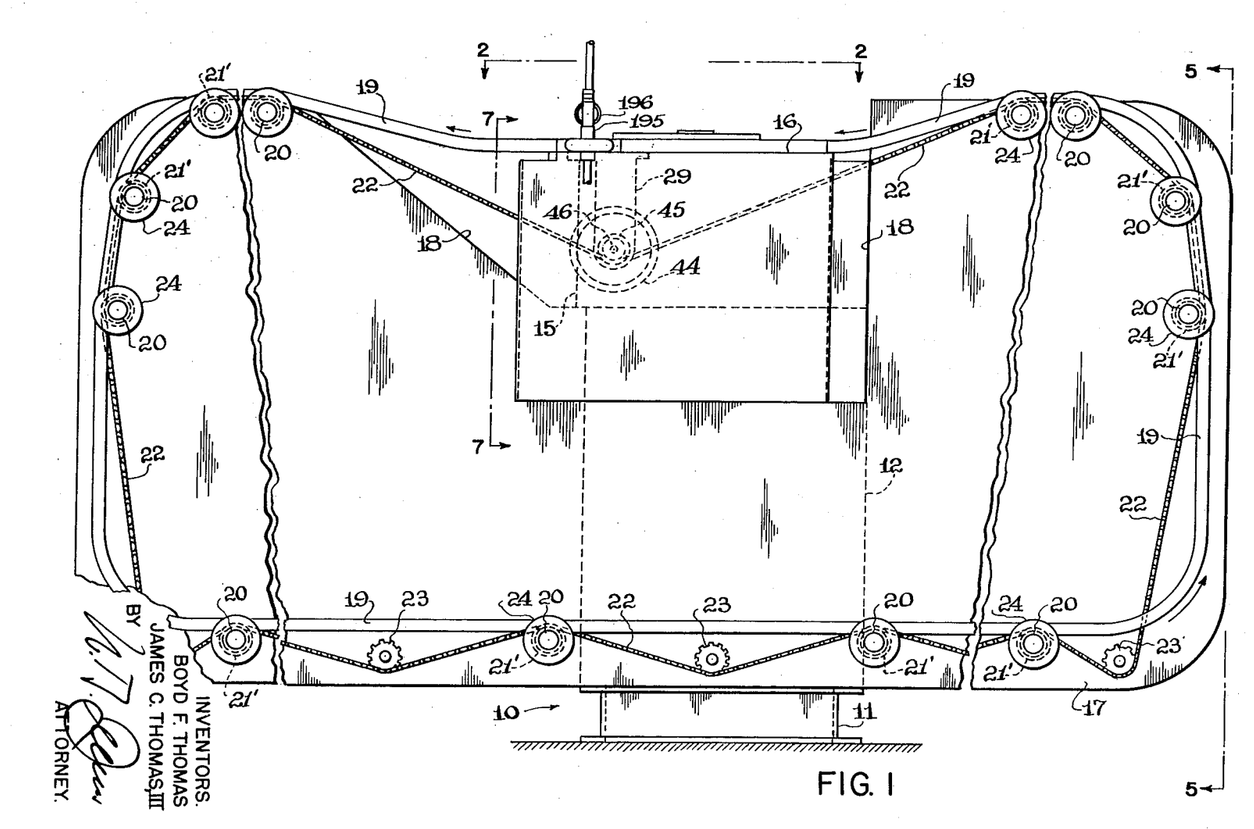
FIGURE 1 is a rear elevational view of a preferred embodiment of a welding apparatus according to the present invention, portions of the core conveyor being broken away at either end to permit showing the apparatus on a larger scale.

As best appears from FIGURE 1, the upper midportion of the loop of cellular core material 19 lacks supporting spindles 20 and instead is supported solely by table top 16. As will be better understood in later portions of this specification, the relatively unsupported lengths of core 19 to either side of the welding station are subject to tension and compression and these conditions are utilized to aid the expeditious advance of the core past the welding station in accordance with principles which will be explained below. Suffice it to say at this point that drive belt 22 drives spindles 20 counterclockwise, as viewed in FIGURE 1, thereby constantly urging core 19 to advance in this same direction past the welding station.

Referring now more particularly to FIGURES 2, 4, 6 and 7, it is pointed out that there are rigidly secured to the underside of table top 16 several vertically disposed brackets supporting various components of the apparatus. These include a long and wide panel bracket 28 and a shaft supporting bracket 29 arranged parallel to one another and to conveyor-supporting panel 17. Panel bracket 28 is detachably secured against the underside of table top 16 as by countersunk machine screws 30 (FIGURE 2) also used in securing table top 16 to the main supporting bracket or panel 15. Panel 28 has an elongated rectangular cutout 31 in its midportion and a T-shaped cutout 32 in its left hand edge (FIGURE 6) for a purpose which will appear presently.

Figure 7:
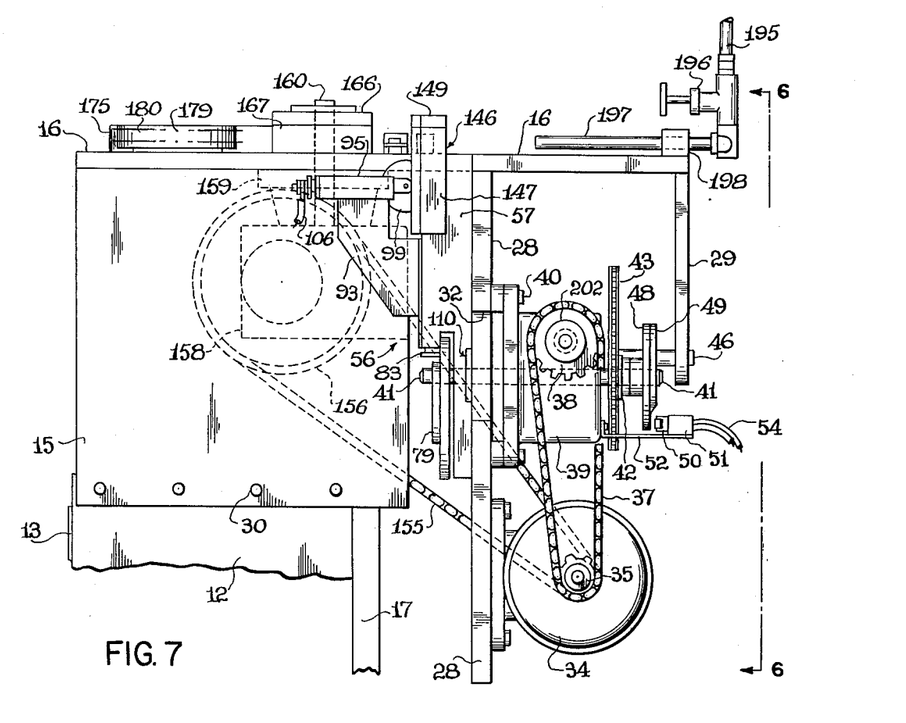
FIGURE 7 is an enlarged fragmentary elevational view taken transversely of the apparatus adjacent the welding station and along lines 7—7 on FIGURES 1 and 6.

Rigidly secured along the lower edge of panel 28 is the main driving motor 34 having sprockets 35 and 36 fixed to its double ended shaft. Sprocket 35 is connected by a chain belt 37 to a sprocket 38 fixed to the input shaft of speed reduction unit 39. The latter is secured across one face of the T-shaped cutout 32 in bracket panel 28 as by cap screws 40 (FIGURE 7). Speed reducer 39 is of any suitable type having a double-ended low-speed output shaft 41 projecting from its opposite ends. Fixed to the rear end of shaft 41 is a sprocket 42 engaging a roller chain 43 passing about a large diameter sprocket wheel 44 fixed to a shaft 46 journaled in part in bracket 29 and in part in panel 17. Secured to the inner end of shaft 46 is a sprocket 45 engaged with roller chain 22 driving spindles 20 of the cellular core conveying mechanism (FIGURE 1).

Figure 6:
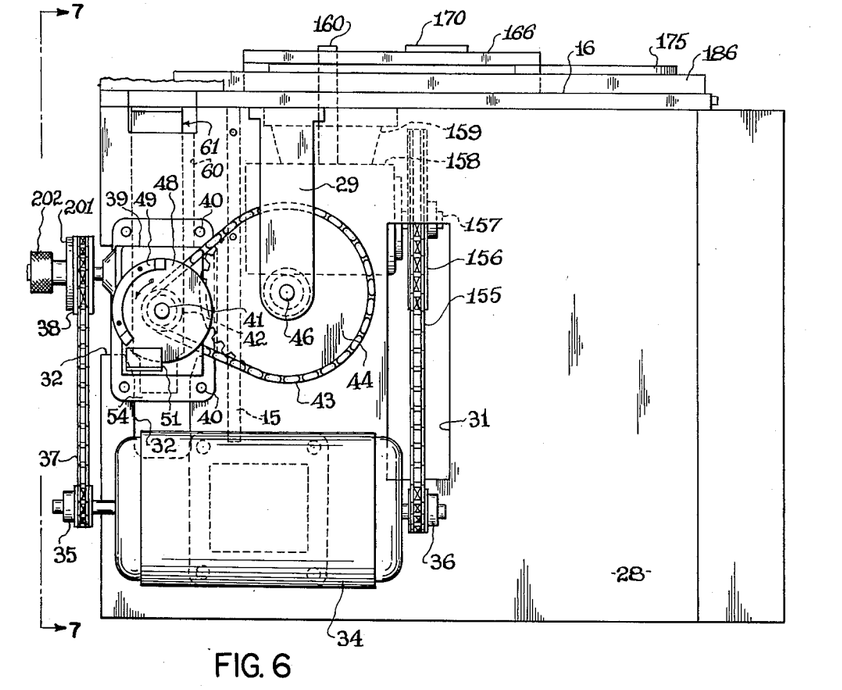
FIGURE 6 is a fragmentary enlarged elevational view from the rear side of the apparatus showing in particular the single motor and the several components driven thereby, the view being taken along lines 6—6 on FIGURES 2 and 7.

Also secured to the rear end of low speed shaft 41 is a cammed disc 48 having a raised arcuate flange 49 engageable with actuator arm 50 of a microswitch 51 rigidly supported from speed reducer 39 by a bracket 52 (FIGURES 6 and 7). It will be understood that switch 51 is connected through conductors 54 with the welder control equipment housed in cabinet 12 and is effective upon closure to control the application of welding current to the welding electrodes.

*The Welding Assembly*

The combined welding electrode assembly and means for controlling the advance of core material 19 designated generally 56 will now be described, particular reference being had to FIGURES 6 to 18. As best appears from FIGURES 13 and 14, assembly 56 includes a rigid main supporting member 57 held securely assembled by cap screws 58 against the front face bracket panel 28. As best appears from FIGURE 14, main support 57 for the electrode assembly overlies and provides a cover for the shallow but wide vertical recess 60 within which a long rigid actuator or slide member 61 operates in a longitudinal and transverse reciprocal movement to control the position of the core arresting pins 62, 62 (FIGURE 13) an action which will be explained more fully presently following a description of the welding assembly.

Figures 8, 9:
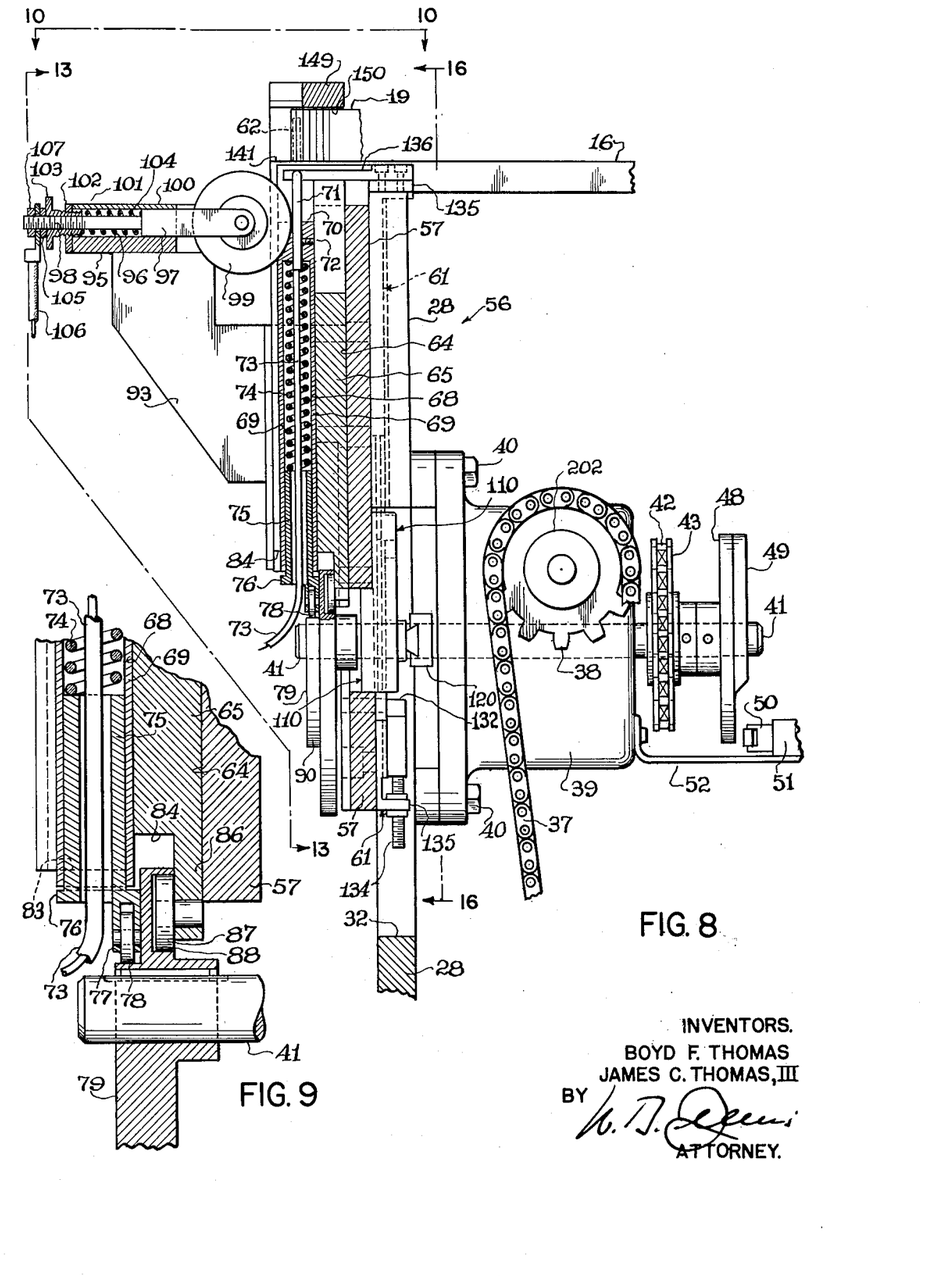
FIGURE 8 is a longitudinal sectional view on an enlarged scale through the welding station with the parts shown in the retracted position of the welding electrodes and as viewed from line 8—8 on FIGURES 4, 10 and 13.
FIGURE 9 is a fragmentary enlarged sectional view taken along the same lines as FIGURE 8 and showing the details of the connections between the driving cam and components of the welding electrode assembly.
Figure 13:
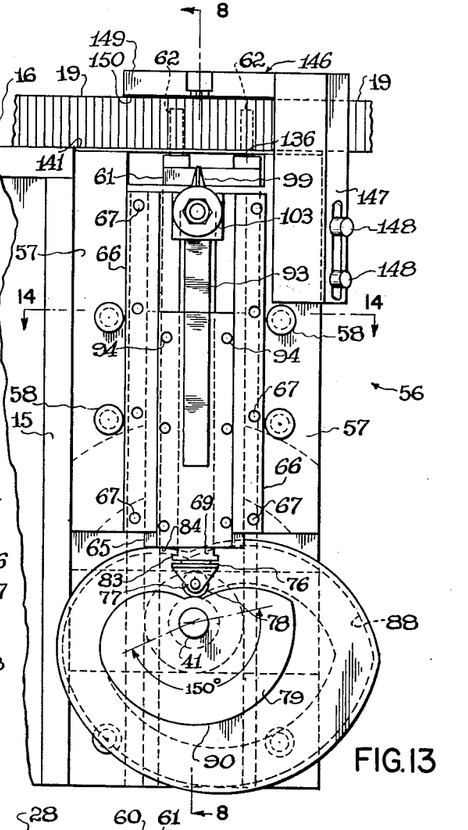
FIGURE 13 is an enlarged elevational view of the welding station showing the core advanced to the next welding position but with the welding electrodes fully retracted, the view being taken along lines 13—13 on FIGURES 2 and 8.
Figure 14:
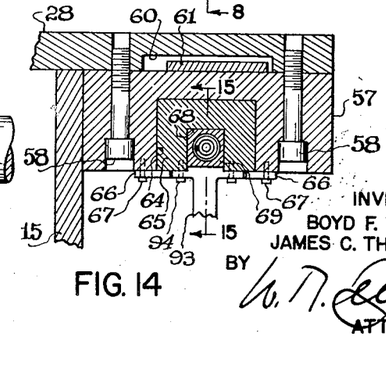
FIGURE 14 is a fragmentary transverse sectional view taken along line 14—14 on FIGURE 13.
Figure 15:
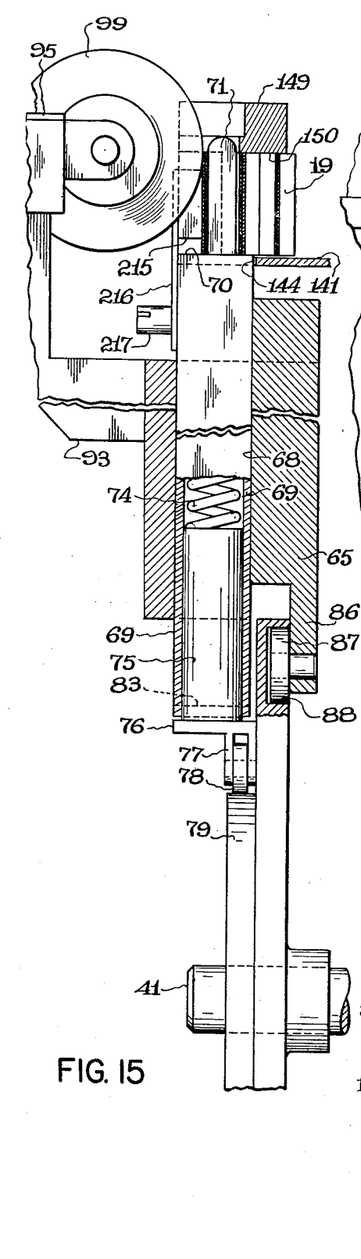
FIGURE 15 is a central longitudinal view partly in section through the electrode assembly of FIGURE 13 but at right angles to the plane of FIGURE 13, as is indicated by line 15—15 on FIGURE 14.

The front face of support member 57 has a vertical recess 64 slidably seating an electrode carrier 65 held in assembled position by retainer plates 66 and cap screws 67. Electrode carrier 65 likewise has a vertical recess 68 slidably seating a precision finished electrode-carrying plunger 69 (FIGURES 14 and 15). Plunger 69 is hollow and its accurately finished upper end surface 70 forms one of two important clamping members for aligning the edges of the strip precisely co-planar with the core faces before the welding operation. The finger-like electrode 71 extends beyond and normal to surface 70 and is rigidly anchored in place on plunger 69, as by a set screw 72 (FIGURE 8). Secured to the lower end of electrode 71 is an insulated lead wire 73 for the welding current, this wire being surrounded by a stiff coil spring 74 having its upper end seated against the closed upper end of plunger 69 and its lower end bearing against a sleeve 75 slidable along the bore of plunger 69. The outwardly flanged lower end 76 of sleeve 75 is formed with a bifurcated member 77 in which is journaled a cam follower roller 78 (FIGURES 9, 13, 15). Cam follower roller 78 rides on the periphery of a specially contoured rim 90 of a cam disc 79 fixed to shaft 41 driven by speed reducer 39. The lower end of electrode supporting plunger 69 is provided with a pair of oppositely extending flanges 83 (FIGURES 11 and 13) engageable with the lower end surface 84 of electrode carrier 65 in certain phases of the electrode excursion and are effective to positively retract finger electrode 71 and the associated parts during the final phase of each excursion.

As appears from FIGURES 8 and 9, a tang 86 protrudes from the lower end of electrode carrier 65 having rotatably fixed to its forward face a cam follower roller 87 having a close rolling contact with the opposite side walls of a closed loop groove 88 formed in the rear face of cam disc 79. In consequence, rotation of cam 79 is effective to reciprocate carrier 65 through its full excursion path. As will be evident from FIGURE 13, the forward face of cam 79 has a generally half-moon shaped periphery 90 along the rim edge of which cam follower roller 78 rides to reciprocate electrode plunger 69, whereas, the rear face of cam 79 is provided with a generally similar but differently contoured closed circuit groove 88 seating cam roller 87. It is pointed out that, by reason of these different contours, electrode carrier 65 reciprocates independently of the plunger but in timed sequence therewith. The purpose served by this action will be described in detail subsequently.

The roller electrode which cooperates with finger electrode 71 will now be described by reference to FIGURES 8 and 10 to 15. A rigid L-shaped bracket 93 of high strength insulating material employed to support the roller electrode is secured to the forward face of electrode carrier 65, as by cap screws 94. Rigidly secured horizontally across the upper end of bracket 93 is a housing 95 having a square bore 96 slidably seating a plunger 97 of square cross-section and having a threaded shank 98 projecting from the outer end of bore 96. The opposite end of plunger 97 is bifurcated and has rotatably mounted therein a bevel edged welding electrode roller 99. Bore 96 is accessible through a removable cover 100 held in place by screws 101 (FIGURE 10).

Figures 10, 11, 12:
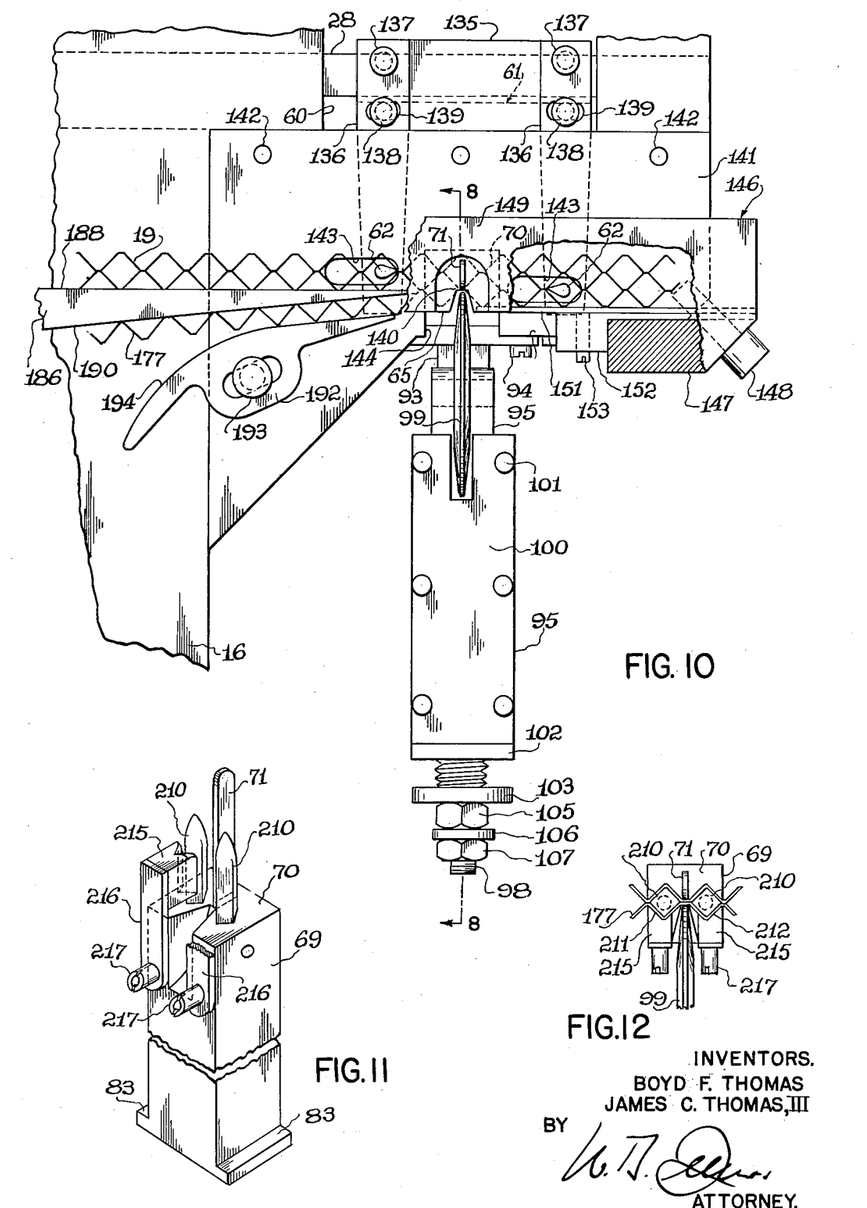
FIGURE 10 is an enlarged fragmentary plan view of the welding station as viewed from line 10—10 on FIGURE 8.
FIGURE 11 is an enlarged perspective view of the finger-like electrode, its supporting plunger and certain of the material positioning and clamping members.
FIGURE 12 is a fragmentary top plan view showing the welding electrodes and certain of the material clamping members with material clamped therebetween in readiness for welding.

The means for adjustably supporting roller electrode 99 in bracket 93 is of importance in controlling the welding pressure to the parts being welded and is shown in some detail in FIGURES 8 and 10. Thus, the outer end of bore 96 in housing 95 is closed by an end plate 102 having a threaded opening through which plunger shank 98 extends. Adjustably seated in the threads of opening 102 is a flanged bushing 103 bearing against a light compression spring 104. The threaded shank 98 has a loose fit with the bore of bushing 103 and rotation of the bushing in plate 102 is therefore effective to vary the spring pressure urging roller 99 against finger 71. Approximately five pounds of pressure applied to the parts being welded gives excellent results when welding stainless steel foil of a grade customarily used in cellular core material. The adjustment is locked in a desired setting by tightening lock nut 105 against the outer end of bushing 103. The insulated electric lead 106 supplying current to the roller electrode is then locked in place over the exposed end of shank 98 by a nut 107.

The Core Arresting Assembly

Figure 16:
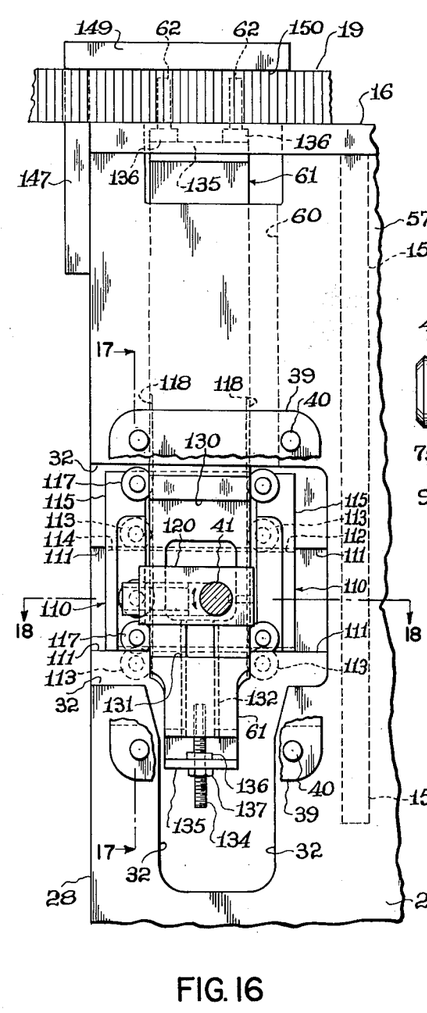
FIGURE 16 is a vertical sectional view taken from the rear of the mechanism for arresting the advance of the core material and taken along line 16—16 on FIGURE 8, the position of the parts being that corresponding to the arrested forward advance of the core in readiness for the next welding operation.
Figure 17:
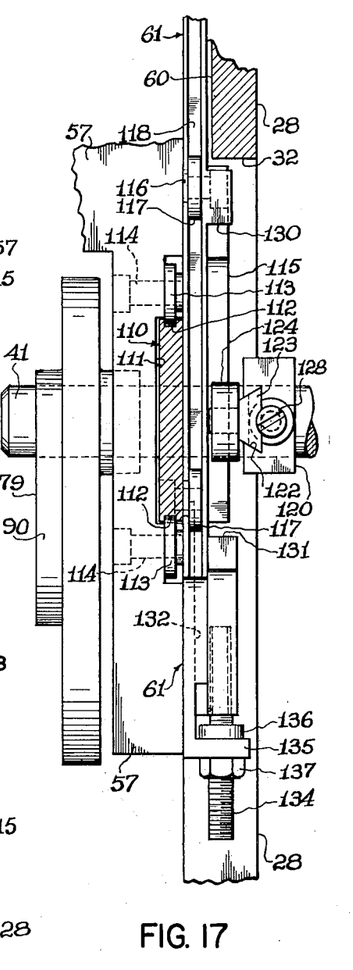
FIGURE 17 is a transverse sectional view on an enlarged scale taken along line 17—17 on FIGURE 16.
Figure 18:
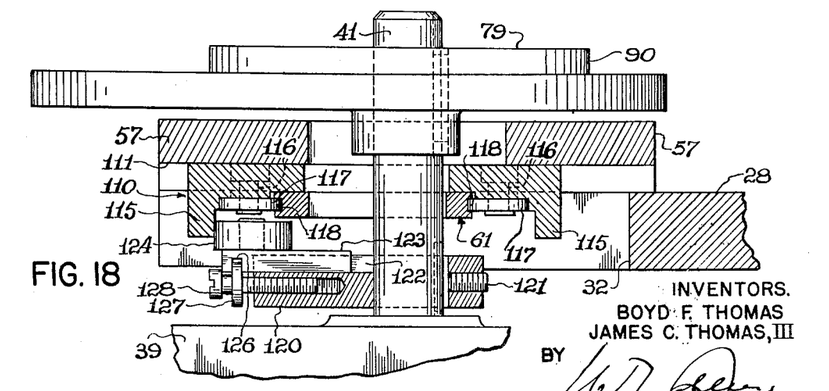
FIGURE 18 is a transverse sectional view taken along line 18—18 on FIGURE 16.

Referring now more particularly to FIGURES 16, 17 and 18, the mechanism for inserting and withdrawing pins 62 to arrest advance of the core in precise welding position at the welding station will now be described. Before proceeding with a detailed description of the structure, it should be borne in mind that the arresting mechanism includes a pair of flat-surfaced members arranged parallel to one another in close sliding relation and confined for reciprocable movement along axes at right angles to one another in a vertical plane. Associated with these members is a rotating crank arm cooperable with upstanding flanges spaced longitudinally of each member and effective at times to shift both members simultaneously along one of the axes of movement and, at times to move one member as the other remains stationary. By this means arresting pins 62 carried at the upper end of one of the members are moved through a rectangular path during each revolution of the driving shaft, the path taken being utilized to control the advance of the core past the welding station in a precise manner. A detailed description of the mechanism follows.

One of the two principal sliding members referred to above, and the one directly supporting arresting pins 62 comprises the thin elongated member 61 movably supported in a shallow recess 60 formed vertically along one side of bracket panel 28. The lower end of slide member 61 extends into the stem of T-shaped cutout 32 in panel 28. The second of the two sliding members comprises a channel-shaped member 110 (FIGURE 17) seated in a shallow recess 111 extending horizontally crosswise of main support member 57. The upper and lower edges of member 110 are provided with parallel grooves 112 seating four rollers 113 mounted on suitable stub shafts 114 mounted in support member 57. As is best shown in FIGURE 18, slide member 110 includes a pair of parallel flanges 115 extending not only across its opposite ends, but their outer edges project above the upper edge of channel 111 for a considerable distance, as is made clear by FIGURES 16 and 17. Journaled on shafts 116 carried by the web portion of slide member 110 are four rollers 117 similar to rollers 113 and each having its rim seated in one of the parallel grooves 118 along the opposite vertical edges of slide member 61.

From the foregoing it will be appreciated that slide member 61 is held captive between rollers 117 supported by the horizontal slide member 110 and that the latter member is held captive for horizontal sliding movement between rollers 113 supported in the fixed body member 57 of the welder. Since member 61 is mounted in rollers 117 secured to member 110, the horizontal movement of member 110 carries member 61 with it. The vertical movement of member 61, however, occurs without any movement of member 110.

The means for reciprocating slide members 61 and 110 along paths at right angles to one another comprises a crank 120 secured to shaft 41 by set screw 121 (FIGURE 18). One face of crank 120 is provided with a dovetail slot 122 (FIGURE 17) seating a complementally shaped slide bracket 123 supporting a roller 124 at its outer end. Accurate adjustment of the effective radial length of crank 120 is assured by a transverse groove 126 in slide 123 seating the annular flange 127 (FIGURE 18) of an adjustment screw 128 mounted in a threaded well opening through the outer end of crank 120. As will be recognized, adjustment of screw 128 along this well serves to adjust the position of roller supporting slide 123 lengthwise of the crank thereby providing a precise control for the throw imparted to slide members 61 and 110 during rotation of crank 120.

It will be noted from FIGURE 18 that roller 124 is positioned to engage the inner parallel surfaces of flanges 115, 115 of slide member 110. As crank 120 rotates to the nine o'clock position it is effective to shift slide 110 to its full path of travel to the left leaving the corresponding surface of flange 115 at the right end of member 110 close to the crank-supporting shaft 41. In consequence, as the crank rotates toward the three o'clock position it will engage the right hand flange 115 to shift member 110 as well as member 61, horizontally to the right.

In traveling between the nine o'clock position and three o'clock position roller 124 is engageable with flange surfaces projecting outwardly from the rear face of slide member 61 and operates to shift this member vertically in a manner which will now be described. Extending horizontally across the rear face of member 61 is a flange 130 having its inner edge lying at right angles to the corresponding surfaces of flanges 115. A similar surface at the lower end of member 61 is located on the head of a T-shaped member 131 having a dovetail sliding connection on its under surface with a cooperating groove 132 (FIGURE 16) formed in the rear face of member 61. Fixed in a well at the lower end of the stem portion of member 131 is a threaded rod 134 passing loosely through an opening in a tang 135 projecting from the lower end of slide member 61. A pair of nuts 136, 137 threaded on rod 134 on the opposite sides of tang 135 are adjustable along the rod in a manner to control the position of T-shaped member 131 with respect to groove 132.

The facing parallel surfaces of flange 130 and of T-shaped member 131 are located in the path of crank-supported roller 124 and serve the same purpose with respect to vertical slide member 61 as facing parallel surfaces of flanges 115 do with respect to horizontal slide member 110. In other words, as crank 120 rotates toward the six o'clock position as viewed in FIGURE 16, roller 124 engages the head of T-member 131 to shift member 61 downwardly to its lowermost position without, however, moving slide member 110. Also, as roller 124 rotates toward the twelve o'clock position it engages the lower surface of flange 130 to lift member 61 upwardly to its uppermost position, or the position it occupies in FIGURE 16.

Viewing FIGURES 8 and 10, it will be noted slide 61 is offset some distance from welding electrodes 71 and 99. Desirably, core arresting pins 62 are spaced closely to either side of the welding electrodes and in close proximity to a vertical plane passing between the electrodes normal to the plane of welding roller 99. To accommodate this objective, the upper end of slide member 61 has a horizontally extending flange 135 to which are secured a pair of rigid pin-supporting fingers 136, 136. To permit adjustment of these fingers in a horizontal plane toward and away from the welding electrodes, flange 135 is provided with two sets of threaded openings seating clamping screws 137, 138, extending loosely through openings in the fingers. One opening 139 in each finger is elongated to permit limited swinging of the fingers toward and away from one another to a desired setting where the fingers are firmly clamped by screws 137, 138.

As will be observed in FIGURE 10, arresting pins 62 are generally elliptical in cross-section with their long narrow facing edges shaped to seat snugly in the corners of the square cross-section core cells. The upper ends of the pins are tapered to facilitate entry of the pins into the corners of overlying core cells. When the pins are fully inserted into the cells, the intervening portion of the core is accurately positioned for entry of the welding electrodes 71 and 99 astride the pair of contacting crests 140 (FIGURE 10) to be welded. The small detachable sector 141 of table top 16 immediately overlying the welding station secured in place by screws or the like 142 has slotted openings 143 overlying the arresting pins 62. Sector 141 also notched at 144 provides clearance for the movement therethrough of electrode-supporting plunger 69.

An important feature of the welding station is the provision of a stationary clutch plate overlying the core opposite the welding electrodes with its lower surface cooperating with end surface 70 of electrode-supporting plunger 69 to align the opposite edges of the foil ribbon with the end faces of the core prior to welding. The stationary clutch plate, designated generally 146, is best shown in FIGURES 14 and 15 as comprising an L-shaped member having its vertical leg 147 rigidly secured to supporting member 57 for the electrode assembly by cap screws 148. The lower surface 150 of horizontal leg 149 is accurately finished and parallel with the surface of table top 16 and with the upper end 70 of welding electrode plunger 69. An adjustable back-up strip 151 for the forward edge of core 19 in the portion thereof immediately adjacent the discharge side of the welding electrodes is best shown in FIGURE 10. This strip lies on edge between the table top and clutching surface 150 of clutch plate 146. Its right hand end as viewed in FIGURE 10 is secured by screws or the like anchored in vertical leg 147 of member 146 along with the thin narrow leg of an L-shaped member 152. The short thick leg of member 152 has a threaded opening seating a set screw 153 the inner end of which bears against back-up strip 151. By adjusting screw 153, the left hand end of strip 151 can be adjusted relative to arresting pin 62 to the extent necessary to compensate for variations in manufacturing tolerances of the parts and in order to support the forward edge of the core and the crests to be welded together in vertical alignment with the contacting plane of the welding electrodes.

Second clamping action applied to the core material is equally as important and accomplished in part by a pair of square fixed pins 210 firmly secured in the top of electrode plunger 69 to either side of electrode finger 71. Pins 210 have a close fit with the interior of the cells to either side of the crests 140 being welded together. It is important that suitable means be provided to hold the two corrugations 211, 212 of ribbon 177 (FIGURE 12) firmly against the pins 210 with the intervening crest of ribbon 177 in accurate abutment with the juxtaposed crest of the core material and that such holding action be applied prior to the arrival of roller electrode 99 at welding position since welding begins substantially immediately that the roller contacts the ribbon.

The foregoing objective is assured in the present design by the provision of a pair of identical cooperative clamping elements 215 mounted on the upper end of a pair of spring arms 216 secured to the forward face of plunger 69 by ferrules 217 mounted on a threaded post seated in plunger 69. The side of clamping members 215 facing pins 210 is V-shaped and complemental to pin 210 and to corrugations 211, 212. The opposite ends of the V-notch are rounded off to facilitate guiding the clamping members over the crests of the ribbon as plunger 69 is elevated into welding position. Spring supporting arms 216 serve to hold clamping elements 215 firmly astride the crests of corrugations 211, 212 to insure the positive seating of the corrugations against the sides of clamping pins 210 and thereby the accurate abutment of the crests 140 then to be welded.

From the foregoing it will be clear that there is provided by the present invention a triple clamping action on the two cells to either side of the crests being welded together and that this triple clamping action is fully applied prior to the application of welding pressure and current. Not only are the opposite edges of ribbon 177 brought into precise co-planar relation with the faces of the core by the action of surfaces 70 and 150, but, in addition, crests 211 and 212 are held firmly pressed against the cooperating faces of pins 210, 210. In consequence, all portions of the material immediately adjacent the area to be welded are firmly coordinated and clamped in position thereby avoiding need for any auxiliary or supplemental holding pins or devices of any kind. For these reasons, and even before the roller electrode 99 passes into contact with ribbon 177, the retraction of arresting pins 62 may be initiated in readiness for the next arresting operation without interfering in any way with the accuracy of the welding operation.

The Ribbon Corrugating and Feed Mechanism

Figure 19:
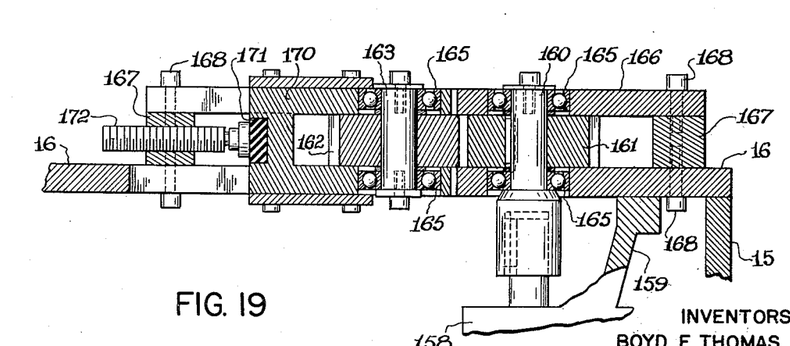
FIGURE 19 is a vertical sectional view through the foil corrugating rolls and taken along line 19—19 on FIGURE 2.

Referring more particularly to FIGURES 2, 6, 7, and 19, there is shown a ribbon corrugating mechanism which is driven from the right hand end of motor 34 by a sprocket 36 engaged with a chain belt 155. The chain passes through opening 31 in bracket panel 28 and drives a large diameter sprocket 156 fixed to input shaft 157 of a speed reducer 158 supported from the under side of table top 16 by a bracket 159. The low speed output shaft 160 of speed reducer 158 passes vertically through table top 16. Keyed to shaft 160 is a driven corrugating wheel 161 which meshes with a similar gear wheel 162 journaled on a spindle 163 (FIGURE 19). Driven shaft 160 is mounted in suitable antifriction bearings 165 one of which is mounted in table top 16 and the other in a bifurcated plate 166 secured to the top of table 16 by spacer blocks 167 and cap screws 168. Spindle 163 for corrugator wheel 162 is mounted in bearings 165 carried by a block 170 slidable along the slot formed in plate 166, block 170 being adjustable toward or away from driven wheel 161 by a threaded spindle 172 mounted in a threaded opening through spacer 167. The inner end of spindle 172 bears against the adjacent end of block 170, and preferably against a rubber pad 171 set into block 170.

A supply coil of flat metal foil ribbon 175 (FIGURE 2) is mounted on a spindle 176 projecting upwardly from table top 16 and passes over a back-up roll of rubber 178 where, if desired, it is perforated by sharp pins 179 protruding from the rim of a perforating wheel 180. The perforated ribbon 175 then passes between the corrugating wheels 161, 162 and is formed with transverse corrugations of a desired shape such as the triangular form illustrated and used to form square core cells. The corrugated ribbon 177 issuing from rolls next passes over the rounded end of a guide shoe 183 adjustably clamped to the top of table 16 by a clamping bolt 184.

Corrugated ribbon 177 is further guided into position at the welding station by the aid of a fence provided by a strip 186 secured to the top of table 16 as by screws 187. The rear side wall 188 of fence 186 provides an accurately positioned back-up or abutment against which the front edge of core 19 presses as it advances into welding position. Wall 188 terminates short of but in direct alignment with the plane of contact between the front edge of welding finger 71 and the adjacent rim of roller electrode 99.

Figures 2, 3:
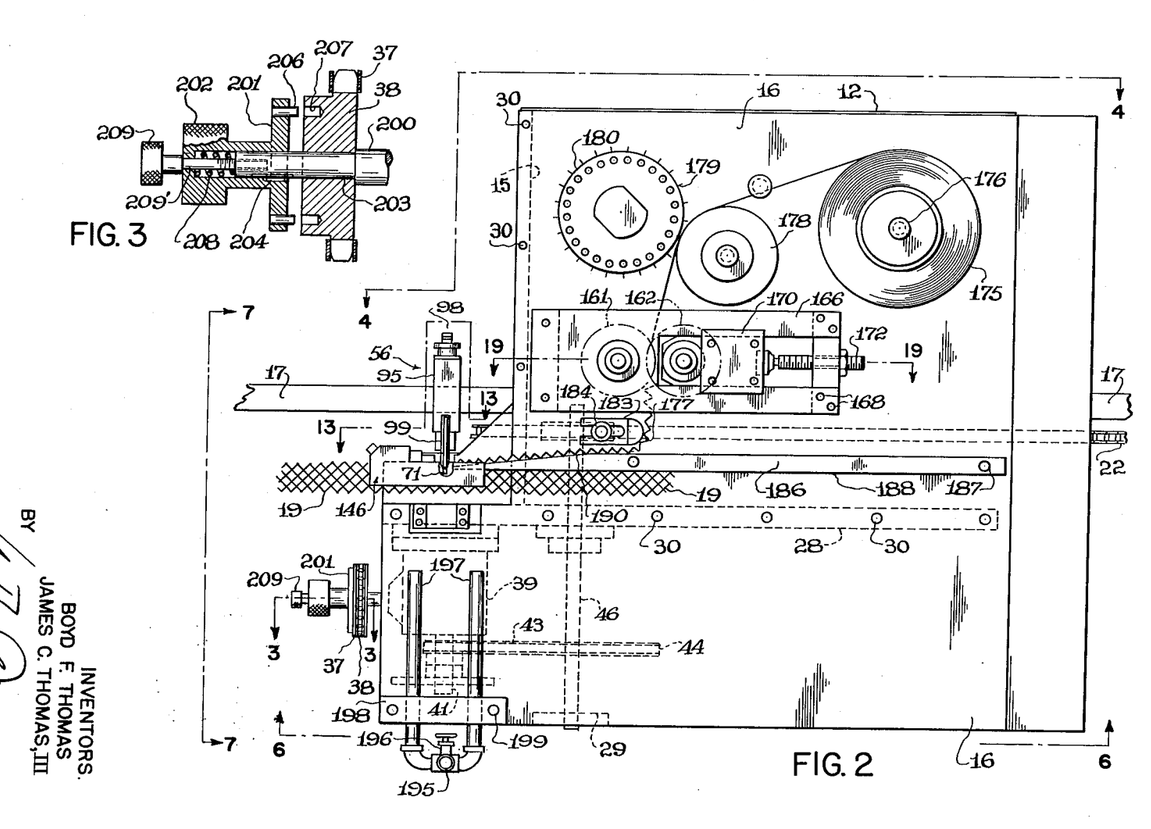
FIGURE 2 is a fragmentary top plan view of the mid-portion of the welding apparatus as viewed from line 2—2 on FIGURE 1.
FIGURE 3 is a longitudinal sectional view on an enlarged scale of a manually operated declutching means for the power unit, the view being taken along line 3—3 on FIGURE 2.
Figure 4:
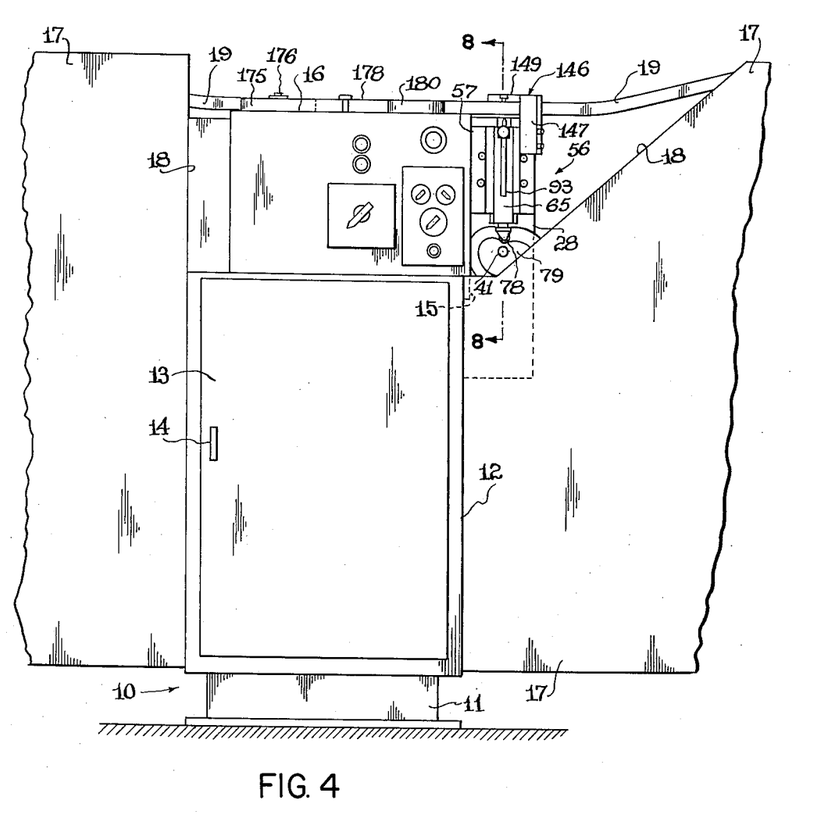
FIGURE 4 is a fragmentary front elevational view of the center portion of the welder as viewed from the operator's control station and taken along line 4—4 on FIGURE 2.
Figure 5:
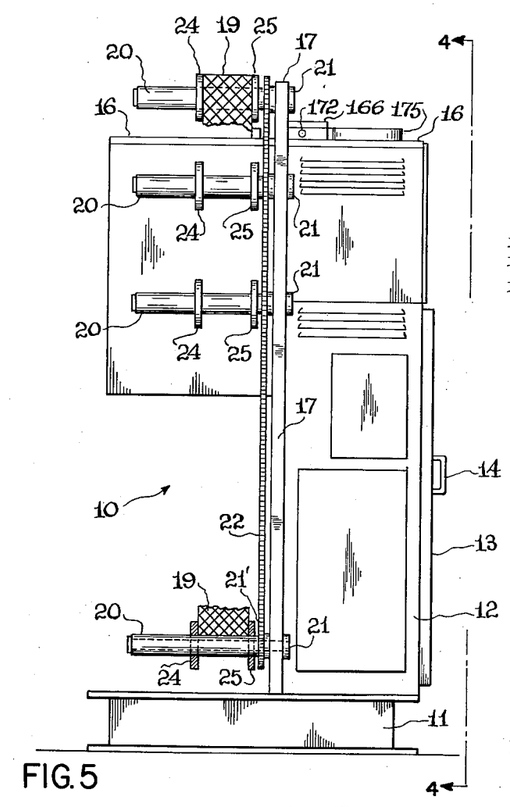
FIGURE 5 is an end elevational view of the apparatus as viewed from the right hand end of FIGURE 1 with portions of the core being broken away to show details of the construction.

It will be observed from FIGURE 2 that the opposite side wall of fence 186 is provided with a long taper 190 merging with guide wall 188 in close proximity to the welding electrodes. These features are shown in somewhat larger scale in FIGURE 10. This figure also shows a secondary adjustable guide dog 192 secured to removable sector 141 of the table top by a clamping screw 193. The contoured side wall 194 of this dog cooperates with guide surface 189 of fence 186 in guiding the corrugating ribbon 177 accurately into welding position between electrodes 71 and 99.

Also performing an important function in guiding the cellular core 19 into proper welding position is a fence which will now be described by reference to FIGURES 2 and 7. Fence 186 is only effective to guide the core into proper welding position only in combination with some expedient for continually urging the ever expanding width of the core against this fence. A highly effective means for this purpose makes use of pressurized fluid fed against the advancing core from a supply line 195 and passing through shut off valve 196 into a plurality of discharge pipes 197. These pipes direct the fluid jets against the core in a manner to hold it resiliently against fence 186. Discharge pipes 197 may be adjusted toward or away from core 19 by means of a clamping block 198 for the pipes and held to the table top by clamping screws 199.

Referring now to FIGURES 2 and 3, there will be described a convenient form of de-clutching mechanism for disconnecting the power source from the electrode assembly whenever this is desirable. For example, at certain times it is desirable to drive the corrugating mechanism without operating the welding assembly, as when corrugating sufficient ribbon to make the first convolution of the core.

For the foregoing and other purposes, main drive chain 37 for the welder engages a sprocket 38 mounted for free rotation about input drive shaft 200 of speed reducer 39. A clutch plate 201 freely slidable along the reduced end 203 of shaft 200 has a knurled handgrip knob 202. Clutch plate 201 is movable axially of a key 204 fixed in the reduced end of shaft 200 and is therefore required to rotate with the shaft. One or more pins 206 fixed to the face of clutch plate 201 are engageable in wells 207 in the hub of sprocket 38 when the clutch plate is pushed toward the sprocket in opposition to a compression spring 208. This spring encircles the threaded shank 209' of a thumb screw 209 having threaded engagement with a well in the end of shaft 203. The clutch is locked in engaged driving position by tightening thumb screw 209 to hold pins 206 seated in wells 207.

Operation

The mode of operation of the described automatic welder will be apparent from the foregoing details of the description of the component subassemblies and their operative relationship one to the other. To summarize this operation, let it be assumed a new supply coil 175 of metal foil stripping has been secured in place on spindle 176 and trained over back-up roller 178 of the perforating subassembly and then inserted between rolls 161 and 162 of the corrugating assembly. At this time it is desirable to disconnect the power drive to the electrode assembly until a full convolution of stripping has been corrugated. To make the disconnect, the operator loosens clamping nut 209 thereby allowing clutch disc 201 to move out of driving engagement with sprocket 38 (FIGURES 2 and 3) and, in this manner, disconnecting the motor drive from shaft 41 of the welder assembly. Motor 34 is then operative to drive only shaft 157 of speed reducer 158 which, in turn, drives the corrugator rolls. Motor 34 continues to drive the corrugator rolls until a complete convolution of corrugated ribbon 177 has been formed and looped on edge about spindles 20 of the core conveyor assembly.

The overlapped ends of the first convolution are brought together with their oppositely facing crests 140 in vertical alignment and abutment with and between the facing surfaces of electrodes 71 and 99. At this time pins 206 of clutch plate 201 are re-engaged and locked by the tightening of thumb nut 209. Closing of clutch 201 re-establishes the power drive to the electrode assembly.

Figure 20:
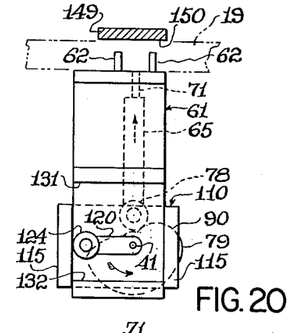
FIGURES 20 to 23 are diagrammatic representations showing different operative positions of the core arresting mechanism and the welding electrode assembly, FIGURE 20 showing the position of the parts as the electrodes start a welding excursion and the remaining views showing the corresponding positions of the parts during successive 90 degree movements of the driving shaft.

An understanding of the manner in which shaft 41 operates core arresting fingers 62 in time phase relationship with welding electrodes 71 and 99 and with the several pairs of clamping members will be facilitated by reference to FIGURES 8 to 17 and 20 to 23. The latter four figures diagrammatically illustrate the relative positions of the welding electrode and of the drive mechanism for core arresting pins 62. Referring first to FIGURE 20, it will be noted crank arm 120 extends horizontally in the nine o'clock position and that roller 78 underlying plunger 69 supporting electrode finger 71 is only slightly removed from the lowest portion of cam surface 90 on cam wheel 79. In this position of the parts, crank arm roller 124 has just completed the movement of arresting pins 62 to the foremost position of these pins. When so located, the facing narrow vertical edges of pins 62 are disposed in core cells to either side of the welding electrodes and function to hold the abutting crests 140, 140 to be welded in welding position, i.e. with crests 140 in direct alignment with the upward excursion path of the welding electrodes, this position of the several parts being best illustrated in FIGURE 10.

It is pointed out and emphasized that the friction between slide members 61 and 110 and with the adjacent surfaces of the supporting structure for these plates that plates 61 and 110 do not move relative to one another or to the supporting structure except when forcibly shifted from one positoin to another by the contact of crank arm 120 and its roller 124 with one of the upstanding flanges of slide members 61 or 110. Accordingly, in the position of parts shown in FIGURES 10 and 20, the core is firmly in its new welding position in readiness for firm clamping in order that arresting pins 62 may be withdrawn as the electrodes are moved into active welding position.

Continued counterclockwise rotation of shaft 41 from the nine o'clock position of crank 120 results in the arcuate portion 90 of cam wheel 79 under-riding roller 78 of plunger 65 to elevate this plunger. Simultaneously with this movement, cam follower roller 87 in groove 88 on the rear side of cam wheel 79 forcibly elevates carrier 65 in unison with plunger 69. As will be understood by reference to FIGURE 8, simultaneous elevation of both electrodes results in finger electrode 71 entering the overlying cell of core 19. Also, core clamping surface 70 at the top of plunger 69 contacts the lower face of core 19 and the lower edge of corrugated strip 177. Contact of the core by surface 70 lifts the core and the strip into firm contact with lower surface 150 of the upper or stationary clutch. The free gap between one of the clutch members and the core face is preferably limited to a few mils. Spring 74 within plunger 69 serves to maintain a firm clamping action on the core and on the strip and also is fully adequate to bring the strip edges into alignment with the core thereby assuring the precisely co-planar relation of its edges with the faces of core 19. Additionally the spring 74 permits relative movement between plunger 69 and electrode carrier 65 to accommodate continued upward movement of roller electrode 99 even though further elevation of the plunger cannot occur.

While finger electrode 71 is entering behind the crest next to be welded to strip 177, it is pointed out that holding pins 210, 210 projecting upwardly from surface 70 of plunger 69 are entering the core cells immediately to either lateral side of the welding electrodes, as is made clear by FIGURE 12. Also occurring concurrently with this movement of holding pins 210 is the upward movement of the clamping members 215, 215 (FIGURES 11, 12), the V-grooves of which pass lengthwise astride the crests of corrugations 211, 212 (FIGURE 12) of strip 177. The ensuing clamping action of corrugations 211, 212 against the associated one of holding pins 210 under the spring pressure applied by spring arms 216 assures that the corrugations will be accurately positioned and clamped in such manner as to hold crests 140, 140 in accurate abutment in readiness for welding.

Figure 21:
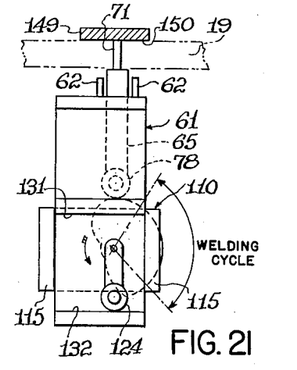
Figure 22:
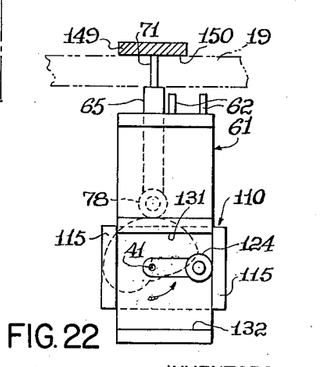
Figure 23:
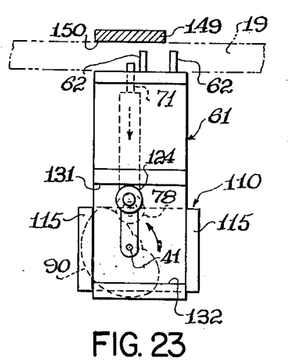

While the foregoing actions are taking place, crank arm 120 is rotating between the nine o'clock and the six o'clock positions and, in so doing, roller 124 contacts the surface of flange 132 carried by the lower end of vertical slide member 61. The crank roller 124 does not actually contact surface 132 until holding pins 210 have been elevated into the core cells to take over the holding action then being performed by arresting pins 62. While the crank is moving from the seven-thirty o'clock to the six o'clock position, pins 62 are being retracted vertically downward out of the core cells. When crank 120 is in the six o'clock position as illustrated in FIGURE 21, pins 62 are fully retracted and the aforedescribed clamping action between surfaces 70, 150 and between members 215 and pins 210 is complete and welding roller 99 is in readiness to begin actual welding. In other words, at this position of shaft 41, switch closing cam 49 on cam wheel 48 is in contact with switch arm 50 (FIGURE 8) to close switch 51 and to energize equipment controlling the welding current. Cam 49 maintains switch 51 closed throughout the rotation of shaft 41 through approximately 120 degrees during which welding current flows between roller electrode 99 and finger electrode 71. It is also pointed out that the surface of cam groove 88 is so designed as to move roller electrode 99 through equal vertical increments during equal arcuate movements of shaft 41. This avoids the production of hot spots between the welding electrodes and assures a uniform weld joint between the core crests which is uniform, of high strength and of maximum effectiveness.

During welding of the abutting core crests, crank 120 moves from the six o'clock to the two-thirty o'clock position, and, in so doing, roller 124 contacts the right hand one of flanges 115 (as viewed in FIGURE 22) on horizontal slide member 110 thereby moving members 110 and 61 bodily to the right in position for arresting pins 62 to enter the next pair of advancing core cells. By the time crank 120 reaches the one-thirty o'clock position, cam 49 is out of contact with switch arm 50 with the result the welder is de-energized. Moreover, roller electrode 99 has completed its upward welding movement and is ready for rapid retraction.

At the time switch 50 opens, cam follower roller 87 operating in closed groove 88 of cam wheel 79 is at the highest point of its upward excursion in readiness for return along the steep return portion of groove 88. Because of this steep area of the groove, carrier 65 returns through the upper half of the return stroke in a minimum of time while the corresponding portions of the arcuate cam rim 90 maintain plunger 69 stationary in its fully extended position. It will be understood that cam surface 90 is of constant radius throughout an arc of 150 degrees or the portion thereof indicated by the double headed arcuate arrow and the legend 150° in FIGURE 13.

Shaft 41 continues to rotate and while plunger-supporting roller 78 is opposite the end of the constant radius portion of surface 90 (approximately the one-thirty o'clock position of crank 120), electrode carrier 65 has been retracted until its lower end is in position to contact the laterally extending pair of flanges 83 on plunger 69 (FIGURES 14 and 15). Accordingly, further counterclockwise rotation of the shaft causes the carrier to contact flanges 83 thereby forcibly retracting plunger 69 to withdraw holding pins 210 and clamping members 215 from engagement with the core and with ribbon 177. Meanwhile, spring 174 within the plunger urges sleeve 75 downwardly to maintain roller 78 in contact with cam surface 90. Also, during this downward withdrawal movement of the electrode assembly, crank 120 is advancing counterclockwise between the ten-thirty o'clock and the nine o'clock positions as a new increment of core 19 and of ribbon 177 advances into welding position.

Throughout the described complete single revolution of shaft 41, shaft 46 driving chain belt 22 for the core conveyor is rotating counterclockwise. This rotation of spindles 20 constantly urges core 19 forwardly toward the welding station and places several feet of the core on the inlet side of the welding station under compression. Likewise, the corresponding rotation of the spindles on the discharge side of the welding station tends to place the adjacent portions of core 19 under tension. In consequence, upon withdrawal of holding pins 210, the respective compressed and tensioned segments of the core to either side of the welding station mutually assist one another in advancing the core by a single cell length, an advance permitted by arresting pins 62 then in the process of being moved forwardly by movement of crank arm 120 from the ten-thirty o'clock to the nine o'clock position. By reason of this action together with the constant feeding action of spindles 20, it is unnecessary for pins 62 to place any load on the core cells in which they are located for the purpose of advancing the core into successive welding positions; instead, pins 62 and the supporting members 136 and slide member 61 function primarily to permit the core to move forward under the impetus of the described stored energy in the core.

As will be appreciated from the foregoing vertical movement of all pins and electrodes takes place relatively quickly and in a small period of time as compared with the period of travel of roller electrode 99 during the welding portion of its cycle.

While the particular method and apparatus for fabricating cellular core material herein shown and disclosed in detail is fully capable of attaining the objects and providing the advantages hereinbefore stated, it is to be undrestood that it is merely illustrative of the presently preferred embodiments of the invention and that no limitations are intended to the details of construction or design herein shown other than as defined in the appended claims.

We claim:

1. In combination, an automatic electric welder for fabricating cellular core material from foil-like stripping corrugated transversely thereof, said welder comprising, means providing a welding station, power driven smooth-surfaced conveyor means for supporting a closed loop of core material and constantly urging the circulation of the core past said welding station at a rate faster than said core is permitted to travel while allowing slippage between the core and said conveyor means, means for intermittently arresting circulation of said core and for holding the same stationary in the vicinity of the welding station for a brief interval in readiness for a welding operation, power driven core clamping means at said welding station for firmly clamping said core and an attached length of corrugated stripping accurately in welding position, and welding electrode means operable in timed sequence following the closing of said clamping means to make a weld between abutting portions of said core and stripping.

2. The combination defined in claim 1 characterized in that said core circulating and arresting means are all disposed opposite the same face of said core along with said welding electrode means and said power driven means for clamping said core and stripping in welding position.

3. The combination defined in claim 1 characterized in that said clamping means includes pairs of cooperating rigid and nonflexible clutch means embracing the crests and adjacent side walls of corrugations of the strip immediately to either side of the strip crest then to be welded to an abutting crest of said core, said pairs of clutching means being interconnected by a common support and cooperating to hold the portions of said core and strip immediately adjacent the path of the welding electrodes accurately and rigidly in welding position.

4. The combination defined in claim 3 characterized in that said pairs of cooperating clutch means are secured directly to and movable with one of said welding electrodes.

5. The combination defined in claim 3 characterized in that said clamping means includes a pair of flat surfaced plates arranged opposite either face of said core and engageable with said core faces to align the lateral edges of said corrugated strip with the adjacent core faces and to hold the same precisely co-planar during the welding of the strip to the core.

6. Automatic welding apparatus adapted to fabricate honeycomb core material progressively from transversely corrugated metal foil strip as a closed loop of said strip is circulated in increments past a welding station, said apparatus including a main frame having a welding station, smooth-surfaced rotatable means arranged to support a large loop of said strip from the edge thereof, driven means for rotating said rotatable means in excess of the speed at which it is desired to circulate said core loop whereby slippage occurs between said smooth-surfaced rotatable means and said core, means movable intermittently into and out of engagement with said core to arrest circulation thereof momentarily and for permitting circulation thereof past said welding station at other times, a plurality of clamping members at said welding station operable in timed sequence with the arresting of said core to clamp a portion of said strip and of said core rigidly in welding position with a crest of said strip abutting and accurately aligned with a juxtaposed crest of said core, and welding electrodes operable to apply welding current and pressure across said abutting crests to weld the same together while movement of said circulating core is arrested.

7. That improvement in the precision fabrication of cellular core material from continuous transversely corrugated metal foil stripping which improvement comprises, forming a large diameter closed loop of said stripping with the width of said corrugated stripping throughout said loop lying substantially in the same plane, urging said core to circulate in a closed loop past a welding station at a rate in excess of welding station requirements, intermittently arresting the circulation of said core past said welding station, and thereupon clamping said arrested core and the attached strip firmly and rigidly in place with a crest of said strip aligned with and abutting the juxtaposed crest of said core, welding said abutting crests together and thereafter releasing said clamping and arresting action thereby permitting said core to circulate past said welding station and into the next welding position.

8. That improvement defined in claim 7 characterized in the application of pressurized fluid against said loop at a point adjacent said welding station and in a direction to urge the same into welding position.

9. That improvement in the precision fabrication of cellular core material from continuous transversely corrugated metal foil stripping which improvement comprises forming a large diameter closed helical loop of said stripping wound edgewise, abutting the oppositely facing corrugations of adjacent convolutions of said stripping and welding the abutting crests thereof together as the crests are stepped past a welding station, constantly urging all portions of said loop to circulate past said welding station at a rate in excess of the speed at which the core is permitted to advance past the welding station, intermittently engaging said core to arrest movement of the core in the immediate vicinity of said welding station as the advancing core reaches the next welding position and continuing to hold the core arrested while clamping the parts to be welded rigidly in aligned position before relaxing arresting engagement with said core.

10. That improvement defined in claim 9 characterized in the use of pressurized fluid discharged against said cellular core material adjacent said welding station and in a manner to urge the core material constantly toward welding position.

11. That improvement in the fabrication of cellular core material defined in claim 10 characterized in the step of continuing to urge the circulation of said core loop past said welding station while the core is rigidly clamped in welding position whereby the portion of the core on the exit side of the welding station is placed under slight tension and the portion thereon on the entrance side of the welding station is under slight compression whereby, upon the release of the clamping action of the core as the weld is completed, the stored tension and compression stresses are instantly available and mutually cooperate in advancing the core into the next welding position.

12. That method of fabricating a continuous transversely corrugated strip of metal foil into a helical loop of cellular core material, which method includes looping a first convolution of said strip edgewise back against itself with the crests of oppositely facing corrugations in abutment, supporting said loop from the edge of the strip on smooth-surfaced driven means continually effective to urge the loop to circulate past a welding station at a rate faster than said core is permitted to advance past said welding station, intermittently engaging the loop at the welding station to arrest movement thereof during the welding cycle, the continuing effort to circulate said loop while arrested being effective to place the portion on the exit side of the welding station in tension and the portion thereof entering the welding station in compression, the tension and compression forces so stored in the core during the welding cycle being effective and operable upon the release of the core at the end of a welding cycle to advance the next increment of the core into welding position.

13. That method of fabricating cellular core material from transversely corrugated metal foil stripping by bonding the crests of consecutive sections of stripping to the oppositely facing crests of sections already bonded together and with the edges of added sections precisely co-planar with the faces of fabricated core, said method comprising constantly urging trailing portions of the core material and of the strip section being added to one lateral edge thereof past a bonding station in a direction parallel to strip sections thereof and at a rate faster than the core is permitted to advance past the welding station, intermittently arresting the advance of the core and strip section past said bonding station while continuing to urge trailing portions of the core and strip past the bonding station thereby placing said trailing portions of the core under compression in a plane between and parallel to the faces of the core to store energy available to resume advance of the core past the bonding station upon release of restraining force on the core, and bonding abutting crests of said core and of said strip together at said bonding station during arrested advance of the core and while holding the edges of the strip co-planar with the core faces.

14. That method of fabricating cellular core material from transversely corrugated metal foil stripping by bonding the crests of consecutive sections of stripping to the oppositely facing crests of sections already bonded together and with the edges of added sections precisely co-planar with the faces of fabricated core, said method comprising constantly urging trailing portions of the core material and of a strip section being added to one lateral edge thereof past a bonding station in a direction parallel to strip sections thereof and at a rate faster than said core is permitted to advance past the welding station, applying a propelling force to said core material to carry leading sections of the core away from a bonding station and to advance trailing sections of the core toward the bonding station in a direction parallel to the length of the core, intermittently arresting the advance of the core and of the strip to the bonding station for successive bonding operations while the core is so arrested, and continuing the application of propelling force on said core thereof tending to increase the tension in sections of the core on the exit side of the bonding station thereby to facilitate the rapid advance of the core into the next bonding position upon termination of said arresting action, and bonding abutting crests of said strip and core together at said bonding station while advance movement of the core is arrested.

15. An automatic welder for fabricating cellular core material from a continuous metal foil strip corrugated transversely of the strip, said welder comprising a frame having a welding station, means for intermittently advancing a corrugated strip of foil past said welding station with the corrugation crests abutting the opposite facing crests along one lateral edge of previously fabricated coring, a welding electrode assembly supported at said welding station including a pair of cooperating independently movable electrodes reciprocable transversely of the core and astride a pair of abutting crests to be welded together, one of said electrodes being adapted to move lengthwise into a cell integral with said core and having a crest in abutment with a crest of said strip then ready for welding, a pair of rigid clamping pins parallel to said one electrode and carried thereby in positions to enter semi-completed core cells to either side of the cell seating said one electrode, a pair of resiliently supported clamping members carried by the support for said one electrode and having surfaces complemental to portions of said strip corrugations and positioned to straddle crests of said strip to either side of the intervening oppositely facing crest then to be welded and cooperating with said clamping pins in holding the crests to be welded in firm accurately coordinated position while the other of said electrodes is traversing said core to weld said crests together.

16. That improvement in the fabrication of welded cellular core material from transversely corrugated continuous metal foil stripping of uniform width, which method comprises, forming a large diameter loop of said foil stripping with the width of said stripping lying in the plane of said loop and with the crests of successive convolutions of the loop facing opposite to and abutting the adjacent crests of the previous convolution, indexing said loop and an attached convolution-building strip of foil in increments past a welding station while alternately applying welding current and pressure to successive abutting pairs of said crests, and jetting pressurized fluid against the expanding width of said core from the first convolution side thereof, said fluid jets being effective to urge said core under light fluid pressure against said continuous strip thereby aiding in holding abutting crests awaiting welding in position preliminary to the applcaton of weldng pressure and current thereto.

17. Welding apparatus for fabricating cellular core material from metal foil ribbon corrugated transversely thereof as the core and ribbon advance step-by-step past a welding station, said apparatus comprising a welding electrode assembly reciprocably astride a pair of abutting crests of said ribbon to weld the same together, means to step a first pair of ribbon lengths past said electrodes repeatedly to weld successive lengths of additional ribbon to the same lateral edge of said cellular core until a core of desired width has been assembled, and means for supplyii.g pressurized fluid against fabricated sections of the core as additional lengths of ribbon are welded in place, said pressurized fluid being effective to apply a restraining and guiding force over a wide surface area of said core to aid in holding the same in position in lieu of structural holdng means likely to damage the metal foil.

18. Automatic welding apparatus for use in welding elongated elements together transversely thereof as said elements are indexed past the path of reciprocably supported welding electrodes, said apparatus comprising a welding station provided with a pair of welding electrodes mounted for reciprocation across the path of advance of a pair of elongated elements to be welded, a first one of said electrodes being movable lengthwise of itself parallel to the path of reciprocation of a second and cooperating roller electrode, cam means to move said first electrode into holding engagement with the elements to be welded while said roller electrode remains retracted and inoperative to weld, cam means operable in timed sequence with said first mentioned cam means to advance said roller electrode across said elements and lengthwise of said stationary electrode while said elements are backed by said stationary first electrode to apply welding pressure and current to weld said elements together, said cam means including power driven means to retract said electrodes forcibly and in reverse order to a position out of contact with said elongated elements while the latter are advancing into the next welding position, one of said cam means including a closed loop groove supporting therein a cam follower having a driving connection with one of said reciprocable electrodes, and spring means interposed between said one electrode and the other electrode and effective to keep said other electrode in pressure contact with its cam operating means.

19. An automatic welder as defined in claim 18 characterized in that said two cam means are mounted on a common power-driven shaft.

20. A welding electrode assembly suitable for use in welding thin metal ribbons together, said assembly including a main frame slidably supporting an electrode carrier, a cam follower mounted on said carrier, power-driven cam means having an endless groove seating said cam follower and operable to move said carrier to and fro along said frame, an electrode supporting member slidable along said carrier and projecting beyond the opposite ends of said carrier, a second cam follower slidably supported in one end of said member and spring biased outwardly away from said member, second power-driven cam means supporting said second cam follower, said cam means being operable to advance one of said electrodes into a stationary welding position followed by the advance of the other electrode across the work to be welded and lengthwise of said stationary electrode and to thereafter retract said electrodes forcibly in reverse order.

21. A welding electrode assembly having a first and a second electrode mutually cooperable and movable relative to one another to perform a welding operation, a pair of rotary cam discs fixed to a power-driven shaft, a main frame supporting said shaft and having a slideway supporting a carrier having a roller electrode thereon, a bore through said carrier parallel to said slideway supporting slidably therewithin a pair of telescopic members spring pressed apart, one of said members having a cam follower thereon riding on the surface of one cam disc, the other of said telescopic members having a finger-like electrode extending parallel to the path taken by the rim of said roller electrode, cam follower means between said carrier and the other of said cams arranged to move said carrier and roller electrode positively in both directions, and means providing a lost motion connection between the other of said cams and said telescopic members and cooperable with said cam means to advance said finger-like electrode to its welding position and to hold the same stationary there while moving said roller electrode into welding position and lengthwise of said stationary electrode and thereafter to retract said electrodes from welding position in reverse order.

22. A welding electrode assembly for use in fabricating cellular core material from metal foil ribbon corrugated transversely thereof, said assembly including a finger-like electrode protruding normally from a flat-surfaced rigid clamping plate, a pair of rigid clamping pins spaced to either side of said electrode and parallel thereto and mounted for movement with said clamping plate, a second rigid clamping plate positioned opposite the other edge of said ribbon from said electrode assembly, means for moving said finger-like electrode into one of an outer row of cells of said cellular core material with said electrode seated against the interior and with said pins seated on the exterior opposite side walls of said cell crest, means for holding said clamping plates clamped against the opposite faces of said core to hold the opposite edges of a corrugated ribbon co-planar with said core faces, a transversely corrugated ribbon having a crest thereof abutting the crest of said core cell in which said finger-like electrode is positioned, resiliently supported clamping fingers embracing crests of said ribbon to either side of the ribbon crest juxtaposed to said finger-like electrode and cooperating with said pins and with said clamping plates in holding said abutting crests firmly and accurately in welding position, and second electrode means movable along one of said abutting crests to apply welding current and pressure to said crests, and means for alternately opening and closing the said clamping components against said core and corrugated ribbon as the latter are advanced progressively thereby to weld abutting crests of said core and ribbon together.

References Cited in the file of this patent

UNITED STATES PATENTS

| | | |
|---|---|---|
| 2,747,064 | Van Pappelendam | May 22, 1956 |
| 2,789,203 | Pigo et al. | Apr. 16, 1957 |
| 2,821,616 | Spott | Jan. 28, 1958 |
| 2,843,722 | Wegeforth | July 15, 1958 |
| 2,866,075 | Van Pappelendam | Dec. 23, 1958 |
| 2,927,991 | Schoelz | Mar. 8, 1960 |